(12) United States Patent
Greinert et al.

(10) Patent No.: US 10,126,625 B2
(45) Date of Patent: Nov. 13, 2018

(54) PARTICLES FOR ELECTROPHORETIC DISPLAYS COMPRISING A CORE AND A RANDOM-COPOLYMER COATING

(71) Applicant: Merck Patent GmbH, Darmstadt (DE)

(72) Inventors: Nils Greinert, Seeheim-Jugenheim (DE); Thomas Bauer, Darmstadt (DE); Matthias Koch, Wiesbaden (DE); Wolfgang Hechler, Lautertal (DE); Thomas Rentschler, Bensheim (DE); Nathan Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 343 days.

(21) Appl. No.: 14/389,793

(22) PCT Filed: Mar. 28, 2013

(86) PCT No.: PCT/EP2013/000933
§ 371 (c)(1),
(2) Date: Oct. 1, 2014

(87) PCT Pub. No.: WO2013/149714
PCT Pub. Date: Oct. 10, 2013

(65) Prior Publication Data
US 2015/0092262 A1   Apr. 2, 2015

(30) Foreign Application Priority Data
Apr. 4, 2012   (EP) .................................... 12002438

(51) Int. Cl.
| | |
|---|---|
| G02B 26/00 | (2006.01) |
| G02F 1/167 | (2006.01) |
| C09C 1/36 | (2006.01) |
| C09C 3/10 | (2006.01) |
| C09B 67/08 | (2006.01) |
| C09B 67/46 | (2006.01) |
| C09B 69/10 | (2006.01) |
| B01J 13/10 | (2006.01) |
| B01J 13/20 | (2006.01) |

(52) U.S. Cl.
CPC .............. *G02F 1/167* (2013.01); *B01J 13/10* (2013.01); *B01J 13/20* (2013.01); *C09B 67/009* (2013.01); *C09B 67/0013* (2013.01); *C09B 69/10* (2013.01); *C09C 1/3676* (2013.01); *C09C 3/10* (2013.01); *C01P 2004/84* (2013.01); *C01P 2006/40* (2013.01); *G02F 2001/1678* (2013.01)

(58) Field of Classification Search
CPC ........................................................ G02F 1/167

USPC ................ 359/296; 427/213.36, 213.31; 252/519.33
See application file for complete search history.

(56) References Cited

U.S. PATENT DOCUMENTS

| | | | |
|---|---|---|---|
| 4,997,864 A * | 3/1991 | Waters ...................... | C08J 3/005 427/221 |
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2005/0168799 A1* | 8/2005 | Whitesides ............ | B82Y 30/00 359/296 |
| 2005/0267252 A1* | 12/2005 | Minami .................. | G02F 1/167 524/556 |
| 2007/0128352 A1 | 6/2007 | Honeyman et al. | |
| 2007/0268244 A1 | 11/2007 | Chopra et al. | |

FOREIGN PATENT DOCUMENTS

| | | |
|---|---|---|
| GB | 2438436 A | 11/2007 |
| JP | 2008145713 A | 6/2008 |
| WO | WO-99/10767 A1 | 3/1999 |
| WO | WO-2005017046 A2 | 2/2005 |
| WO | WO-2009100803 A2 | 8/2009 |
| WO | WO-2010089057 A2 | 8/2010 |
| WO | WO-2010089058 A1 | 8/2010 |
| WO | WO-2010089059 A1 | 8/2010 |
| WO | WO2010089060   * | 8/2010 |
| WO | WO-2010089060 A2 | 8/2010 |
| WO | WO-2011154103 A1 | 12/2011 |
| WO | WO-2012019704 A1 | 2/2012 |

OTHER PUBLICATIONS

International Search Report for PCT/EP2013/000933 dated Jun. 21, 2013.
Sunohara, S., et al., "Investigation of color electrophoretic display utilizing electrophoretic colored particles", Nippon Gazo Gakkaishi, vol. 46, No. 4, (2007), pp. 247-253.
Sunohara, S., et al., "Preparation of poly-vinyl pyrrolidone fine particles by inverse emulsification-evaporation process in solvent", Kobunshi Ronbunshu, vol. 62, No. 7, (2005), pp. 310-315.

* cited by examiner

*Primary Examiner* — Monique R Peets

(57) ABSTRACT

This invention relates to particles comprising a core particle and a polymeric shell, electrophoretic fluids comprising such particles, and electrophoretic display devices comprising such fluids.

9 Claims, 3 Drawing Sheets

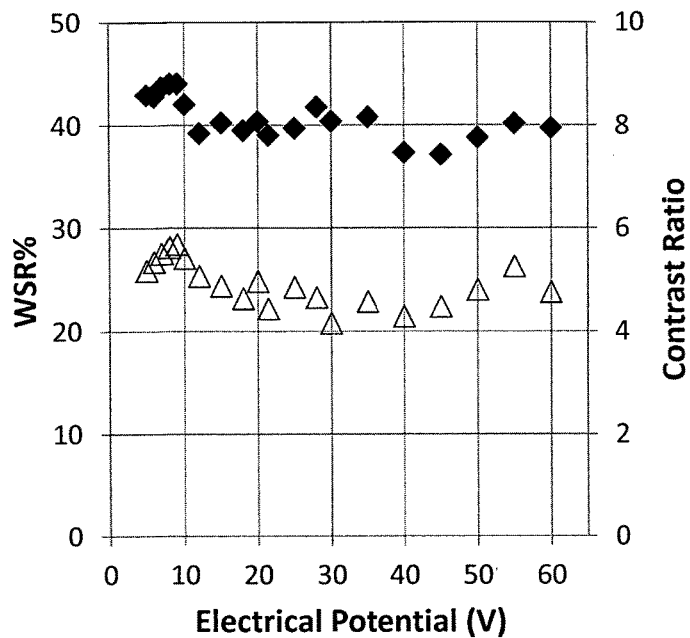
Fig. 1 (filled diamond) white state relative to MgO standard (in %), (open triangle) contrast ratio
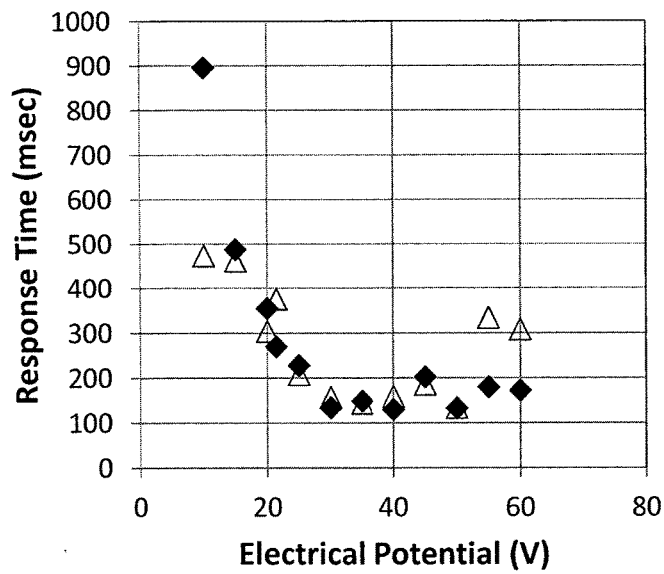
Fig. 2: (filled diamonds) Time to On-State, (open circles) Time to Off-State

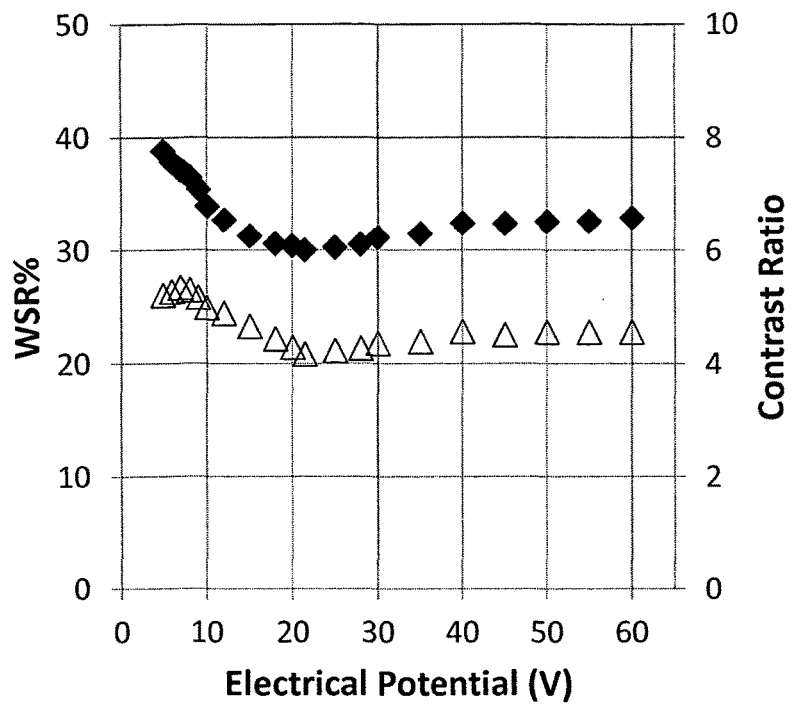
Fig. 3: (filled diamond) white state (in %), (open triangle) contrast ratio
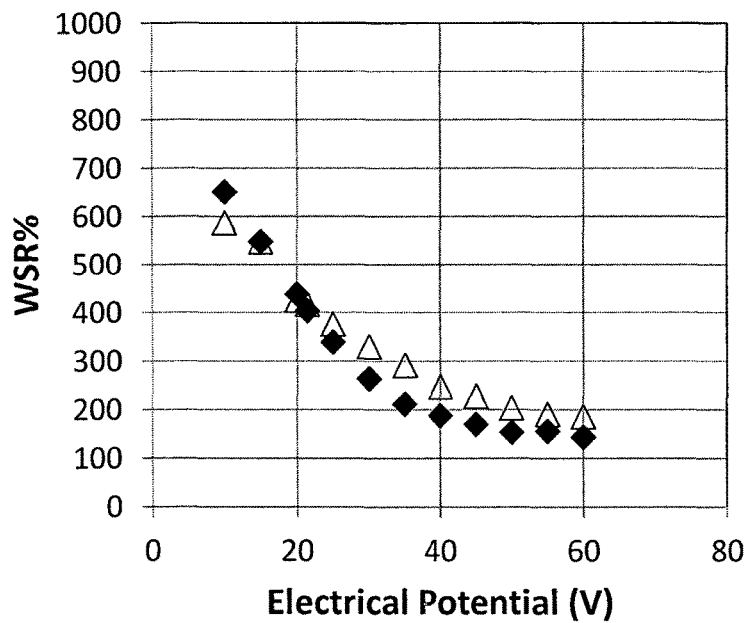
Fig. 4: (filled diamonds) Time to On-State, (open circles) Time to Off-State

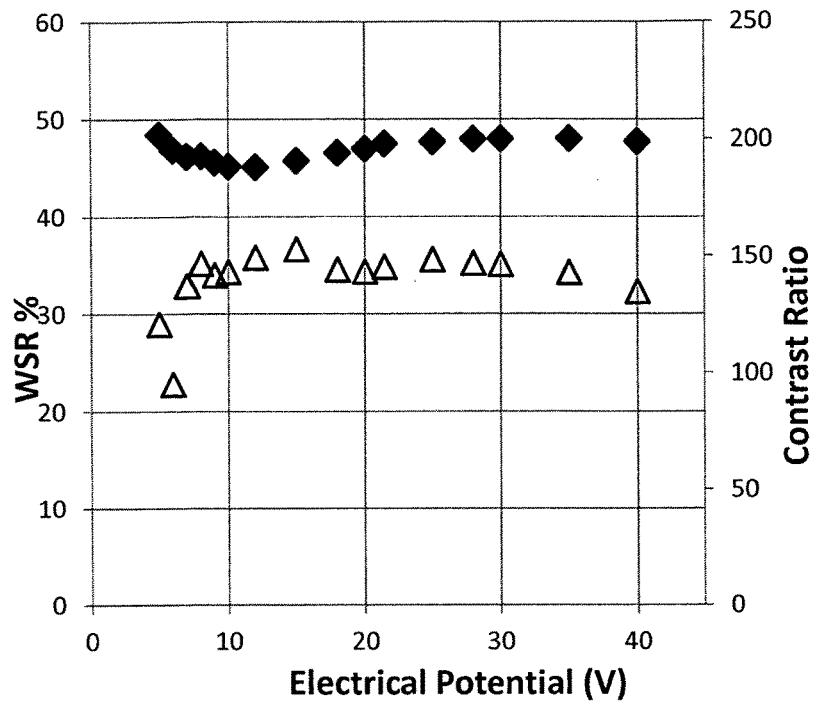
Fig. 5: (filled diamond) white state (in %), (open triangle) contrast ratio
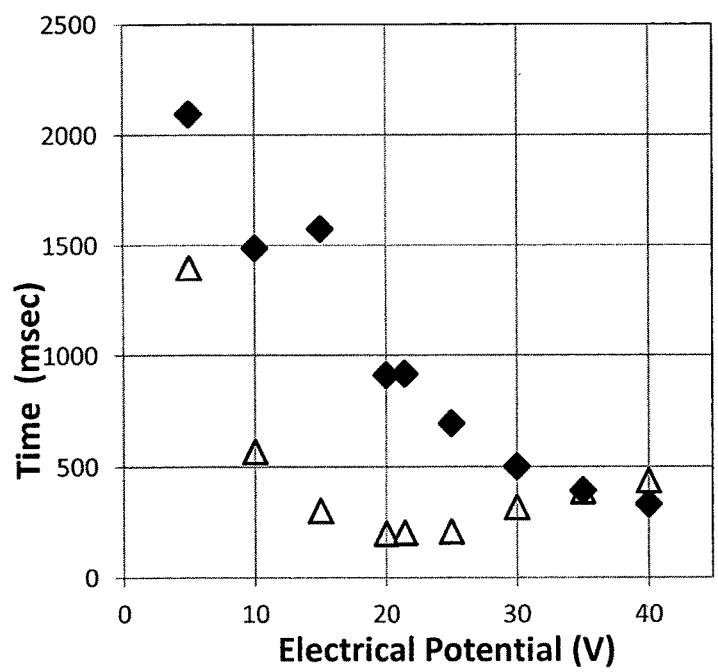
Fig. 6: (filled diamonds) Time On-State, (open triangle) Time Off-State

PARTICLES FOR ELECTROPHORETIC DISPLAYS COMPRISING A CORE AND A RANDOM-COPOLYMER COATING

CROSS-REFERENCE TO RELATED APPLICATIONS

This application is a national stage application (under 35 U.S.C. § 371) of PCT/EP2013/000933, filed Mar. 28, 2013, which claims benefit of European Application No. 12002438.5, filed Apr. 4, 2012, both of which are incorporated herein by reference in their entirety.

This invention relates to particles comprising a core particle and a polymeric shell, electrophoretic fluids comprising such particles, and electrophoretic display devices comprising such fluids.

In recent years a need has developed for low power, low cost and light weight display devices. EPDs (Electrophoretic Displays) can fulfil this requirement. An EPD generally comprises charged electrophoretic particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. The use of different coloured particles in a single pixel has been exemplified in recent patent literature (U.S. Pat. No. 7,304,634, GB 2 438 436, US 2007/0268244). Particles comprising a polymer and an organic pigment are described in Nippon Gazo Gakkaishi 46(4) 2007, 247-253 and in Kobunshi Ronbunshu, 62(7), 310-315 (July 2005). Usually electrophoretic fluids comprise a charged inorganic nanoparticle such as titania, alumina or barium sulphate, coated with a surface layer to promote good dispersibility in dielectric media and a dielectric fluid media.

There continues to be a demand for improved electrophoretic fluids and a simple preparation of coloured and white reflective particles which can be easily dispersed in non-polar media.

An improved route to provide such particles and new electrophoretic fluids has now been found. Fluid compositions containing these particles are used in monochrome and colour electrophoretic displays (EPD).

The present invention relates to electrophoretic fluids comprising particles comprising a core particle and a polymeric shell adsorbed onto the core particle wherein the polymeric shell consists of a random copolymer having monomer or macromonomer building blocks, and the random copolymer comprises at least one charged or chargeable, optionally hydrocarbon insoluble, structural unit and at least one hydrocarbon soluble, stabilising structural unit. Furthermore, the invention relates to such particles per se, a process for their preparation, and electrophoretic displays comprising such particles.

The subject matter of this invention specifically relates to white reflective polymer particles, and to electrophoretic fluids and displays comprising such white reflective polymer particles.

The advantage of the invention is the convenience and flexibility in defining the charge of the particle. The method is applicable to wide range of particles and pigments. Furthermore, the invention helps to overcome some of the complications in EPD fluid development and leads to high performing fluids.

The invention describes a method to control the charge of particles in electrophoretic fluids, by adsorbing special random copolymers onto the particle surface, which also act as dispersants. The copolymers can be adsorbed onto the particle surface by physisorption, such as van der Waals forces, ionic interactions and/or acid-base interactions. These special random copolymer dispersants can be used to conveniently modify the surface of most particles or pigments, especially to provide a charge to the particles or to change the charge of a particle. The new polymers are called charge selective polymer dispersants or CSD throughout the specification. The CSD can be used to define a desired charge on the particle/pigment (either positive or negative as desired) and the CSD sterically stabilises the particles/pigments against aggregation. First the charge selective polymer dispersant (CSD) is synthesised. In a second step the CSD is used to disperse the pigment and modify the particle charge The CSD is a random-type copolymer. Random copolymers and their preparation are well known in the art and prepared as follows under conditions known to the person skilled in the art.

The CSD polymers are random copolymers and are prepared by free radical co-polymerisation of at least two monomers, which are selected from the class of acrylates, methacrylates, styrenes, vinyl, or acrylamides. The monomers have a molecular weight between 70 and 10000 and can be a molecule (monomer) or a functional oligomer/polymer (macromonomer).

The random copolymers may be graft copolymers or may have a comb-like structure. The term "structural unit" means a part of the copolymer derived from one or more types of monomers or macromonomers and/or comprising one or more types of monomer or macromonomer building blocks. The term "building block" means a homo- or copolymerised polymer chain.

The hydrocarbon soluble, stabilising structural unit of the CSD copolymer mainly comprises at least one monomer or macromonomer which itself or its homopolymer is soluble in hydrocarbons, especially in dodecane. The charged or chargeable, optionally hydrocarbon insoluble, structural unit mainly comprises at least one monomer or macromonomer which itself or its homopolymer is optionally insoluble in hydrocarbons, especially in dodecane. At least one monomer or macromonomer shows high affinity to adsorb onto the surface of the core particle. Preferably, the charged or chargeable, optionally hydrocarbon insoluble, structural unit exhibits strong adsorption to the core particle. At least one of the monomers interacts with charge control agents and thus controls the charge of the particle. The macromonomer is either commercially available or can be prepared by a polymerisation reaction (especially polycondensation) followed by an endgroup functionalisation in order to obtain the macromonomer.

The CSD polymers comprising structural units for steric stabilisation and charge modification are used to disperse pigment particles. Particles according to the invention are obtained by a route represented in Scheme 1.

Scheme 1

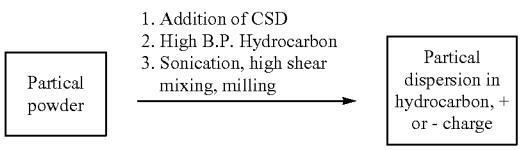

The preparation of further polymers and particles according to the invention can be carried out analogously to the illustrative preparation shown above. The preparation of further polymers and particles according to the invention can also be carried out by other methods known per se to the person skilled in the art from the literature.

A typical CSD is a random co-polymer that consists of an optionally hydrocarbon insoluble, charge control structural unit (the charged or chargeable structural unit) and a hydrocarbon soluble, stabilizing structural unit. These two structural units are combined as a random copolymer. A variant of the invention comprises a co-polymer that consists of a hydrocarbon insoluble, charge control structural unit and a hydrocarbon soluble, stabilizing structural unit.

The chemistry of the optionally hydrocarbon insoluble, charge control structural unit is optimised to create a desired charge when adsorbed onto an EPD particle. This structural unit contributes between 1-99% percent by weight of the total CSD, especially preferred are 20-96%. The molecular weight of the total CSD is 5000-500,000. Especially preferred are 5,000-100,000.

The hydrocarbon soluble structural unit of the CSD mainly comprises a hydrocarbon soluble polymer, monomer or macromonomer. Typical are the acrylated or methacrylated polycondensates of fatty acids, functional poly-dimethyl siloxanes (PDMS), or long chain alkyl (meth)acrylates. Preferably, the hydrocarbon soluble structural unit consists of a hydrocarbon soluble polymer, monomer or macromonomer Examples are:

acrylated or methacrylated fatty acid polycondensates based on the following monomers: 2-Hydroxydecanoic acid, 2-Hydroxyoctanoic acid, 2-Hydroxyoctanoic acid, 3-Hydroxydecanoic acid, 3-hydroxyoctanoic acid, 10-Hydroxydecanoic acid, 12-Hydroxyoctadecanoic acid, 12-Hydroxyoctadecanoic acid, 12-hydroxystearic acid, 15-Hydroxypentadecanoic acid, 16-Hydroxyhexadecanoic acid, 2-Hydroxyhexadecanoic acid, 2-hydroxytetradecanoic acid, 2-Hydroxydodecanoic acid, 2-Hydroxyhexanoic acid, DL-α-Hydroxystearic acid, DL-β-Hydroxylauric acid, DL-β-Hydroxymyristic acid, DL-β-Hydroxypalmitic acid, 2-hydroxy dodecanoic acid, 15-Hydroxy-hexadecanoic acid, 17-hydroxy-octadecanoic acid, 12-hydroxy-9-cis-octadecenoic acid, and (Meth)acrylate terminated Polyisobutylene, or Polyisoprene.

Also suitable are the mono-methacrylate terminated Polydimethylsiloxanes (PDMS-MA; CAS: [146632-07-7]), The molecular weight Mn of these compounds is preferably between 600 and 10000, preferred is a molecular weight of 1000-10000, and most preferred 5000-10000. Such compounds are commercially available like i.e. Gelest MCR-M07, MCR-M11, MCR-M17, or MCR-M22.

Long alkyl chain (meth)acrylates include octylmethacrylate, decylmethacrylate, dodecyl methacrylate, tetradecylmethacrylate, hexadecylmethacrylate, ethyl hexyl methacrylate, octylacrylate, decylacrylate, dodecylacrylate, tetradecylacrylate, hexadecylacrylate, ethyl hexyl acrylate.

Preferred are the acrylated or methacrylated polycondensate of the 12-hydroxystearic acid (PHSA), preferably with a molecular weight Mn of 1000 to 10000, especially 1000 to 7500, preferably 1000 to 5000, and Gelest MCR-M22 (mono-methacrylate terminated Poly-dimethylsiloxanes; PDMS-MA) with a molecular weight of 10000, and dodecyl methacrylate, especially polystearate methacrylates and mono-methacrylate terminated poly-di methylsiloxanes.

The charged or chargeable, optionally hydrocarbon insoluble, structural unit mainly comprises at least one charged or chargeable monomer. These monomers may be selected from of the following, optionally hydrocarbon insoluble, compounds:

2-(tert-Butylamino)ethyl methacrylate, 2-(Diethylamino)ethyl methacrylate, 2-(Dimethylamino)ethyl methacrylate, Hydroxybutyl methacrylate, 2-Hydroxyethyl methacrylate, Hydroxypropyl methacrylate, mixture of hydroxypropyl and hydroxyisopropyl methacrylates, 2-Hydroxypropyl 2-(methacryloyloxy)ethyl phthalate, Methacrylic acid, Acrylic acid, 2-(Diethylamino)ethyl acrylate, 2-(Dimethylamino)ethyl acrylate, 3-(Dimethylamino)propyl acrylate, 4-Hydroxybutyl acrylate, 2-Hydroxyethyl acrylate, 2-Hydroxy-3-phenoxypropyl acrylate, Hydroxypropyl acrylate, 2-Aminoethyl methacrylate hydrochloride, 3-Sulfopropyl methacrylate potassium salt, [2-(Acryloyloxy)ethyl]trimethylammonium chloride, 3-Sulfopropyl acrylate potassium salt, 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride, sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl) Acrylic Acid, 3-(4-Pyridyl)Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-yl)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl)Amino)-2-Oxoethyl)-3-(4-Methoxyphenyl)Acrylic Acid, 2-(2-(Cyclohexylamino)-2-Oxoethyl)-3-(4-Methoxyphenyl) Acrylic Acid, 1-vinylimidazol, 4-Acryloylmorpholine, N-Vinylcaprolactam, N-Methyl-N-vinylacetamide, (Vinylbenzyl)trimethylammonium chloride, N-Dimethylvinylbenzylamine, 2-Isopropenylaniline, 3-Vinylaniline, 4-Vinylaniline, 4-Vinylpyridine, 2-Vinylpyridine, N-Vinyl-2-pyrrolidinone.

Preferably, 2-(tert-Butylamino)ethyl methacrylate, 2-(Diethylamino)ethyl methacrylate, 2-(Dimethylamino)ethyl methacrylate, 2-methacryloxy ethyl trimethyl ammonium chloride (MOTAC), and/or acryloxy ethyl trimethyl ammonium chloride (AOTAC) are used, especially 2-(tert-Butylamino)ethyl methacrylate and/or 2-methacryloxy ethyl trimethyl ammonium chloride (MOTAC).

Additionally, the charged or chargeable, optionally hydrocarbon insoluble, structural unit can comprise at least one comonomer selected from most monomer types, in particular methacrylates, acrylates, acrylamides, methacrylamides, acrylonitriles, alpha-substituted acrylates, styrenes and vinyl ethers, vinyl esters, and propenyl ethers, preferably monomers which themselves or their homopolymers are insoluble in hydrocarbons.

The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), Allyl methacrylate, Benzyl methacrylate, 2-Butoxyethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, Di(ethylene glycol) methyl ether methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Isobornyl methacrylate, Isobutyl methacrylate, 2-Isocyanatoethyl methacrylate, Isodecyl methacrylate, Lauryl methacrylate, Methacryloyl chloride, 2-(Methylthio) ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Ethyl methacrylate (EMA), and/or n-Butyl methacrylate (BMA) are used.

Acrylates:

2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, i(ethylene glycol) ethyl ether acrylate technical grade, Di(ethylene glycol) 2-ethyl hexyl ether acrylate, Di pentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-($\beta$-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl $\alpha$-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, Tetrahydrofurfuryl acrylate, 3-(Trimethoxysilyl) acrylate, 3,5,5-Trimethylhexyl acrylate.

Preferably Methyl acrylate, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl) trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, $\alpha$-Bromostyrene, 4-tert-Butoxystyrene, 4-tert-Butylstyrene, 4-Chloro-$\alpha$-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, $\alpha$,2-Dimethylstyrene, 2,4-Dimethylstyrene, 2,5-Dimethylstyrene, 2,4-Diphenyl-4-methyl-1-pentene, 4-Ethoxystyrene, 2-Fluorostyrene, 3-Fluorostyrene, 4-Fluorostyrene, 3-Isopropenyl-$\alpha$,$\alpha$-dimethylbenzyl isocyanate, Methylstyrene, $\alpha$-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl) styrene, 4-(Trifluoromethyl)styrene, 2,4,6-Trimethylstyrene. Preferably Styrene and/or Divinyl benzene are used.

Vinyl Groups

4-Vinylanisole, 9-Vinylanthracene, 3-Vinylbenzoic acid, 4-Vinylbenzoic acid, Vinylbenzyl chloride, 4-Vinylbenzyl chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers, i.e. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, and fluorinated monomers of above.

Further suitable co-monomers have groups for further reaction, e.g. glycidyl methacrylate ((2,3-epoxypropyl)-methacrylat), maleic anhydride, 2-hydroxyethyl methacrylate, etc. for reaction with the pigment particles.

The random copolymers of the invention usually comprise a hydrocarbon soluble structural unit and a charge control structural unit. Each of these contributes between 1-99% percent by weight to the total CSD. Especially preferred is 20-96% by weight. All weight percentages here and in the following are based on the weight of the total CSD.

When PHSA or PDMS macro monomers are used, the random copolymers preferably comprise 20-80% by weight of the hydrocarbon soluble structural unit, especially 30-70% by weight. Advantageously, the random copolymers comprise 45-55%, especially 50%, by weight of the hydrocarbon soluble structural unit. The remainder comprises the charge control structural unit in each case.

When smaller hydrocarbon soluble monomers like long chain alkyl (meth)acrylates are used, the random copolymers preferably comprise 55-96% by weight of the hydrocarbon soluble structural unit, especially 65-96% by weight.

Advantageously, the random copolymers comprise 70-90% by weight of the hydrocarbon soluble structural unit. The remainder comprises the charge control structural unit in each case.

Preferred CSD polymers are random copolymers comprising mono-terminated polydimethylsiloxan methacrylate, optionally (2,3-epoxypropyl)-methacrylat, and 2-tert-butylaminoethylmethacrylate as well as graft or comb-like copolymers comprising polystearate methacrylate, optionally (2,3-epoxypropyl)-methacrylat, and 2-tert-butylaminoethylmethacrylate. Especially preferred are graft or comb-like copolymers comprising polystearate methacrylate, and 2-tert-butylaminoethylmethacrylate.

Another preferred variant of the invention are random copolymers comprising mono-terminated polydimethylsiloxan methacrylate, (2,3-epoxypropyl)-methacrylat, and 2-tert-butylaminoethylmethacrylate as well as graft or comb-like copolymers comprising polystearate methacrylate, (2,3-epoxypropyl)-methacrylat, and 2-tert-butylaminoethylmethacrylate.

Also suitable are random copolymers comprising dodecylmethacrylate, and (2-(methylacryloyloxy)ethyltrimethyl ammoniummethylsulfat.

The CSD polymers of the invention can preferably be prepared by free radical polymerization, polycondensation, and combination of polycondensation followed by free radical polymerization. Also suitable would be controlled radical polymerizations, and ionic polymerization.

Especially preferred is the preparation by free radical polymerization. Suitable initiators are for example 2,2'-Azobis(4-methoxy-2.4-dimethyl valeronitrile), 2,2'-Azobis(2.4-dimethyl valeronitrile), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-butyl-2-methylpropionamide), 2,2'-Azobis(N-cyclohexyl-2-methylpropionamide), 2,2'-Azobis(2-methylpropionitrile), 2,2'-Azobis(2-methylbutyronitrile), and Dimethyl 2,2'-azobis(2-methylpropionate). Preferably, 2,2'-Azobis(2-methylpropionitrile), 2,2'-Azobis(2-methylbutyronitrile), and Dimethyl 2,2'-azobis(2-methylpropionate) are used.

The CSD polymers are used to prepare particle dispersions that are further formulated into electrophoretic fluids. The principle is that the CSD is adsorbed onto the core particle surface and that the CSD provides steric stabilization in the fluid against aggregation.

The core particle is combined with the dispersion medium and the CSD which is typically dissolved in a solvent. The mixture is then subjected to heating, milling, sonication, or high-shear mixing which disperses the particle or pigments. The dispersing step can optionally be followed by a reaction step in which the CSD is chemically linked to the particle surface. The dispersion can be washed by repeated centrifugation and redispersion in fresh dodecane in order to remove excess CSD. The particles may be isolated by common techniques if necessary.

The core particles can be selected to achieve different optical effects. Properties can vary from being highly scattering to being transparent. The pigments can be coloured including black or white.

Suitable pigments to achieve a white optical effect are titanium dioxide, Zirconium dioxide, Zinc oxide, Zinc sulfite, Calcium carbonate, Cerussite, Barium sulfate, Kaolinite, Diantimony trioxide.

Preferably, titanium dioxide based pigments are used which could have the rutil, anatase, or amorphous modification, preferably rutil or anatase. Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont 8103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765.

Examples for pigments suitable to achieve color or black are: Carbon black, chromium (III) oxide green, cobalt blue spinel, iron (III) oxide red, iron (III) oxide orange, iron oxide hydroxide (FeOOH) yellow, iron oxide ($Fe_3O_4$) black, iron (II, III) oxide black. Organic pigments with structures based on Cu-phthalocyanine, quinacridone, monoazo, disazo, perylene, naphthalimide, quaterrylene or diketopyrrolopyrrole are also suitable for the present invention.

The resulting particles according to the invention are preferably spherical particles with a size (diameter) in the range of 50 nm-3 µm, preferably 100-1000 nm. Especially preferred are particles having a particle size of 200-500 nm, especially 250-350 nm. Particle sizes are determined preferably by photon correlation spectroscopy of particle dispersions by a common apparatus such as a Malvern NanoZS particle analyser.

Particles of the invention are primarily designed for use in electrophoretic displays, especially for use in mono, bi or polychromel electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

The CSD covered particles of the invention, especially the present white reflective polymer particles may be used in combination with coloured or black particles, e.g. with coloured or black polymer particles.

The CSD covered particles; especially the presented white reflective particles may be used in combination with:
- A dyed fluid.
- An oppositely charged black.
- With oppositely charged coloured particles.
- With equally charged coloured particles and oppositely charged black particles.

Preferably these black or coloured polymer particles comprise a polymerised or co-polymerised dye. Especially coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles. Especially, the polymer particles described in WO 2009/100803, WO 2010/089057, WO 2010/089058, WO 2010/089059, WO 2010/089060, WO 2011/154103 and/or WO 2012/019704 are suitable for incorporation in the CSD polymers of the invention. Preferably, polymer particles described in WO 2010/089057 and/or WO 2012/019704 may be used.

Typical additives to improve the stability of the fluid (either by steric stabilisation or by use as a charging agent) are known to experts in the field and include (but are not limited to) the Brij, Span and Tween series of surfactants (CRODA), Infineum surfactants (Infineum), the Solsperse, Ircosperse and Colorburst series (Lubrizol), the OLOA charging agents (Chevron Chemicals) and Aerosol OT surfactants (Cytec).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol OT (Aldrich), Span 85 (Aldrich), and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The coloured and white reflective polymer particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection.

EXAMPLES

The characterisation of the formulations is performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Electrophoretic inks are prepared by formulating one or two of EPD particle types with one or more charge control additives (surfactants) in dodecane. Electrophoretic inks with a single particle type and single control additive are typically prepared by mixing 3% w/w particles and 3% w/w charge control agent in dodecane.

Electrophoretic inks are also prepared from two oppositely charged particle types. These are generally formulated with two different charge control agents.

Measurement of the Luminance and Contrast Ratio

The luminance and contrast ratio is characterised by switching two particle inks (i.e. white/magenta) in a 1×1 inch macro pixel (parallel glass slides, 20 µm separation, 1×1 inch ITO array on each slide) and measuring the resulting white state reflectivity (WSR %) and contrast ratio (X-rite Color i5 with standard integrating sphere, calibrated against MgO standard). The electrophoretic inks are tested by applying electrical potential between 1 and 60V.

Example 1: TBAEMA-g-PDMS Charge Selective Dispersant Prepared by Batch Polymerisation, EPD Particle, and Electrophoretic Ink 50 g of n-butyl acetate (Merck, 101974), 5.0 g of monoterminated polydimethylsiloxan methacrylate (ABCR, AB146684), 0.5 g of (2,3-Epoxypropyl)-methacrylat (Merck, 800609), 4.5 g of 2-tert-Butylaminoethylmethacrylate (Aldrich, 444332), and 0.12 g of Vazo 67 (DuPont) are combined in a 100 ml 3-neck flask equipped with reflux condenser, nitrogen supply, and septum. A preheated heating block (70° C.) is raised under the reaction vessel and the reaction is allowed to continue for 2 h.

12.0 g of the resulting polymer solution and 10.0 g of TiO$_2$ particles (DuPont, Ti-Pure R960), 0.5 g of N,N-dimethyldodecylamine (Aldrich, 384386) are combined in a 100 ml round bottom flask and allowed to disperse and react at 120° C. for 24 hours. The resulting dispersion is deposited (benchtop centrifuge, RCF=3000, 20 min) and redispersed in fresh dodecane thrice.

Electrophoretic inks with 3% wt of the prepared particles and 5% wt Aerosol OT (Aldrich, 323586), respectively 3% wt of a sodium alkyl (branched) benzene sulfonate are prepared and the Zetapotential characterised using a Malvern Zetasizer Nano ZS. With the Aerosol OT a Zetapotential of +54 mV, is found.

Example 2: TBAEMA-g-PDMS Charge Selective Dispersant Prepared by Feed Polymerisation, EPD Particle, and Electrophoretic Ink 30 g of n-butyl acetate (Merck, 101974) are pre-heated to 85° C. (temperature at the heating block) in a 100 ml 3-neck flask equipped with reflux condenser, nitrogen supply, and septum. 5.0 g of mono-terminated polydimethylsiloxan methacrylate (ABCR, AB146684), 0.5 g of (2,3-Epoxypropyl)-methacylate (Merck, 800609), 4.5 g of 2-tert-Butylaminoethylmethacrylate (Aldrich, 444332), and 0.12 g of Vazo 67 (DuPont) are combined and metered into the reaction vessel over a period of 2 h using a syringe pump. After addition of the reactants, an additional 0.12 g of Vazo 67 is added and the reaction is allowed to continue for 2 h.

1.0 g of the resulting polymer solution and 2.0 g of TiO$_2$ particles (DuPont, Ti-Pure R960) are combined and subjected to ultrasound for 45 min in an Ultrasoundbath (VWR Ultrasonic bath, USC600TH, 260 W output). The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of +4 mV, and with Span 85 (Aldrich, S7135) a Zetapotential of +3 mV is found.

Example 3: Polystearate Methacrylate (PSMA)

967.5 g of 12-hydroxystearic acid (TCI, H0308, Lot # AIXUF-NJ) are melted at 115° C. for 2 hours in a pre-weighed 2 Liter 3-neck round-bottom-flask fitted with a thermometer, stopper, vacuum adaptor, magnet stirrer, and heating mantle. 2.23 g Methane sulphonic acid (Aldrich) is added and the temperature adjusted to 105° C. Vacuum (65 mBar at the beginning and 20 mbar at the end of the reaction) is applied to extract water. The progress of the reaction is monitored in the 1H NMR spectrum by following the decrease of the signal strength at 3.6 ppm compared to the 0.9 ppm resonance. The reaction is stopped once 99% conversion is reached.

To 384.0 g of the resulting product, 384.0 g of Xylene (Merck, 108685), 0.36 g of N,N-dimethyldodecylamine (Aldrich, 384386), 0.45 g of 4-tert-Butylpyrocatechol (Merck, 801987) and 48.5 g of glycidylmethacrylate (Merck, 800609) are added. The reaction is continued at 140° C. under a nitrogen atmosphere. The progress of the reaction is monitored by determining the acid value by titration. The reaction is complete once an acid value of 0.0003 is reached. Titration is performed using a 0.05M KOH in ethanol solution. Samples of approx. 0.5 g are removed from the reaction, diluted with toluene and titrated against Phenolphthalein. The reaction product is diluted with Xylene to obtain a polymer solution with a concentration of 50.0%.

Example 4: TBAEMA-g-PSMA Charge Selective Dispersant, EPD Particle Dispersed Using a Ball Mill, and Electrophoretic Ink 35 ml of n-butyl acetate (Merck, 101974) are pre-heated to 85° C. (temperature at the heating block) in a 100 ml 3-neck flask equipped with reflux condenser, nitrogen supply, and septum. 10.0 g of Polystearate methacrylate precursor solution (Example 3), 0.5 g of (2,3-Epoxypropyl)-methacrylat (Merck, 800609), 4.5 g of 2-tert-Butylaminoethylmethacrylate (Aldrich, 444332), and 0.12 g of Vazo 67 (DuPont) are combined and metered into the reaction vessel over a period of 2 h using a syringe pump. After addition of the reactants, an additional 0.12 g of Vazo 67 is added and the reaction is allowed to continue for 2 h.

5.0 g of the polymer solution, 15.0 g TiPure R960 (DuPont), 60.0 g n-butyl acetate (Merck, 101974), 0.280 diethanolamine are added to a 150 ml double walled stainless steel vessel. 100 g of stainless steel balls (diameter=2.0 mm) are added and the mixture is milled for 15 min at 4000 rpm to 5000 rpm using a 3-disc-inset with a radius of 2.0 cm. The milling balls are separated from the dispersion, 15 g of dodecane are added and the butyl acetate is removed on a rotary evaporator. Subsequently, the particles are deposited (benchtop centrifuge, RCF=3000, 20 min) and redispersed in fresh dodecane thrice. A dispersion with a solid content of 43.8% is obtained.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of +20 mV, and with Span 85 (Aldrich, S7135) a Zetapotential of +20 mV is found.

Example 5: Charge Selective Dispersant, EPD Particle with Negative Zeta Potential, and Electrophoretic Ink 30 g of n-butyl acetate (Merck, 101974), Polystearate methacrylate precursor solution (Example 3), 0.5 g of (2,3-Epoxypropyl)-methacrylat (Merck, 800609), 3.0 g of Methylmethacrylate (Merck, 800590), and 1.5 g of Methacrylic acid (Merck, 800578) are combined in a 100 ml 3-neck flask equipped with reflux condenser, nitrogen supply, and septum. The reaction mixture is pre-heated to 85° C. (Temperature of the heating block). 0.2 g of Vazo 67 (DuPont) is added and the reaction is allowed to continue for 2 hours.

6.8 g of the resulting polymer solution and 10.0 g of TiO$_2$ particles (DuPont, Ti-Pure R960) are combined and subjected to ultrasound for 3 min (Branson Sonifier B15, Standard horn and microtip, 150 W), while the reaction mixture is cooled by an ice bath. Subsequently, the dispersion is transferred to a 100 mL round bottom flask, 0.1 g Diethanolamine (Merck, 116205) is added, and the mixture is allowed to react at 120° C. for 5 hours. After cooling, 0.5 g of Trioctylamine (Merck, 845064) is added and the mixture is stirred for 5 hours. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of −64 mV, and with Span 85 (Aldrich, S7135) a Zetapotential of −17 mV is found.

Example 6: Charge Selective Dispersant, EPD Particle, and Electrophoretic Ink Showing High White State Reflectivity 35 g of n-butyl acetate (Merck, 101974) are pre-heated to 85° C. (temperature at the heating block) in a 100 ml 3-neck flask equipped with reflux condenser, nitrogen supply, and septum. 10.0 g of Polystearate methacrylate (Example 3), 0.5 g of (2,3-Epoxypropyl)-methacrylate (Merck, 800609), 4.0 g of 2-tert-Butylaminoethyl-methacrylate (Aldrich, 444332), 0.5 g Vinylimidazol (Aldrich, 235466), and 0.12 g Vazo 67 (DuPont) are combined and metered into the reaction vessel over a period of 2 hours using a syringe pump. After addition of the reactants, an additional 0.12 g of Vazo 67 is added and the reaction is allowed to continue for 2 h. A polymer solution with a solid content of 13.2% is obtained.

7.6 g of the resulting polymer solution, 10.0 g of $TiO_2$ particles (DuPont, Ti-Pure R960), and 50.0 g Dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 100 mL round bottom flask, 0.1 g Diethanolamine (Merck, 116205) is added, and the mixture is reacted at 120° C. for 5 hours. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice. The resulting dispersion has a solid content of 33.9%.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of +26 mV, and with Span 85 (Aldrich, S7135) a Zetapotential of +13 mV is found.

Electrophoretic inks with two oppositely charged particles prepared resulting in a formulation of 15% wt of the prepared particles, 5% wt colour particles (prepared as described in WO 2012/019704), 1% Aerosol OT, 2.5% Span 85 in Dodecane.

The electrophoretic ink is tested in a standard LC test cell consisting of two parallel glass slides (20 µm separation) both having a 1×1 inch ITO coating. Electrical potential between 1 and 60V are applied, while measuring the resulting white state reflectivity (WSR %), contrast ratio, and response time of the fluid. The measured luminance of the white state (integrating sphere) is measured as being about 40% (of a MgO standard) for all applied potentials, while the contrast ratio is about 5 (FIG. 1). The response time is shown in FIG. 2.

Example 7: Charge Selective Dispersant, EPD Particle, and Electrophoretic Ink Showing High White State Reflectivity 180 g of n-butyl acetate (Merck, 101974) are pre-heated to 85° C. (temperature at the heating block) in a 500 ml 3-neck flask equipped with reflux condenser, nitrogen supply, and septum. 40.0 g of Polystearate methacrylate (Example 3), 2.0 g of (2,3-Epoxypropyl)-methacrylate (Merck, 800609), 18.0 g of 2-tert-Butylaminoethyl-methacrylate (Aldrich, 444332), and 0.48 g Vazo 67 (DuPont) are combined and added over a period of 3 hours using a dripping funnel. After addition of the reactants, an additional 0.48 g of Vazo 67 is added and the reaction is allowed to continue for 2 h. A polymer solution with a solid content of 15.2% is obtained.

6.8 g of the resulting polymer solution, 10.0 g of $TiO_2$ particles (Kronos 2305), and 50.0 g Dodecane (Merck, 820543) are combined in a plastic bottle and subjected to ultrasound for 3 min (Branson Sonifier B15, Standard horn and microtip, 150 W), while the reaction mixture is cooled by an ice bath. The dispersion is transferred to a 100 mL round bottom flask, 0.1 g Diethanolamine (Merck, 116205) is added, and the mixture is reacted at 120° C. for 5 hours. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice. The resulting dispersion has a solid content of 33.5%.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of +30 mV, and with Span 85 (Aldrich, S7135) a Zetapotential of +4 mV is found.

Electrophoretic inks with two oppositely charged particles are prepared resulting in a formulation of 15.0% wt of the prepared particles, 5% wt colour particles (prepared as described in WO 2012/019704), 1.0% Aerosol OT, 3.0% Span 85 in Dodecane. The electrophoretic ink is tested in a standard LC test cell consisting of two parallel glass slides (20 µm separation) both having a 1×1 inch ITO coating. Electrical potential between 1 and 60V are applied, while measuring the resulting white state reflectivity (WSR %) and contrast ratio of the fluid. The measured luminance of the white state (integrating sphere) is measured as above 30% (of a MgO standard) for all applied potentials, while the contrast ratio is above 4 (FIG. 3). The response time is shown in FIG. 4.

Example 8: Copolymer Charge Selective Dispersant, EPD Particle, and Electrophoretic Ink 24.0 g Dodecylmethacrylate (Merck, 800589), 8.9 g (2-(Methylacryloyloxy)ethyltrimethyl ammoniummethylsulfat (Aldrich, 408123), 1.2 g 2-Mercaptoethanol (Merck, 805740), and 50.0 g 2-Propanol (Merck, 109634) are combined in a 250 ml three-neck flask equipped with reflux condenser and argon supply. The reaction mixture is heated to 90° C. and the setup is flushed with argon, 0.2 g Vazo 67 (DuPont) is added and the reaction is continued for 6 hours.

2.5 g of the resulting polymer, 20.0 g 2-Propanol (Merck, 109634), 25.7 g Dodecane (Aldrich, 386707), and 10.0 g TiPure R960 (DuPont) are combined in a 100 ml round bottom flask and homogenised. Remaining volatile components are removed using a rotator evaporator until no further condensation at 60° C. and 2 mbar is observed. Subsequently, the dispersion is stirred for 3 hours at 120° C. The resulting dispersion in dodecane has a solid content of 38.6% and exhibits dispersed particles under an optical microscope.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of +43 mV, and with Span 85 (Aldrich, S7135) a Zetapotential of +0 mV is found.

Example 9: Charge Selective Dispersant with a Soft/Bulky Ion, EPD Particle, and Electrophoretic Ink An ion exchange between 2.16 g sodium acrylate (Aldrich, 408220) and 9.97 g Tetrahexylammoniumbromid (Aldrich, 252816) is performed with 38 g deionised water and 26.6 g dichloromethane (Merck, 106050). After shaking and phase separation, the DCM phase is isolated and washed twice with fresh d.i. water. 8.5 g tetrahexylammonium acrylate is obtained after removing the DCM using a rotary evaporator.

10 g of n-butyl acetate (Merck, 101974) are added to a 100 ml 3-neck flask equipped with reflux condenser, nitrogen supply and septum and pre-heated to 85° C. (temperature at the heating block). 5.0 g of n-butyl acetate, 0.1 g of (2,3-Epoxypropyl)-methacrylat (Merck, 800609), 1.0 g of monoterminated Polydimethylsiloxan methacrylate (ABCR, AB146684), 0.8 g of Methylmethacrylate (Merck, 800590), 0.1 g of Tetrahexylammoniumacrylate and 0.02 g of Vazo 67 (Dupont) are combined and metered into the reaction vessel using a syringe pump over a period of 2 h. After addition, 0.02 g of Vazo 67 is added and the reaction is allowed to continue for 2 hours.

To the resulting polymer solution 5 g of $TiO_2$ particles (DuPont, Ti-Pure R960) and 0.1 g diethanolamine (Merck, 116205) is added and the reaction temperature raises to 120° C. The reaction is continued for 5 h. The resulting dispersion is filtered through a 50 micron cloth (SEFAR NITEX 03-50/1). Afterwards, the particles are deposited (benchtop centrifuge, RCF=3000, 20 min) and redispersed in fresh dodecane thrice.

Electrophoretic inks with 3% wt of the prepared particles and 3% wt additive are prepared and the Zetapotential characterised using a Malvern Zetasizer Nano ZS.

With Aerosol OT (Aldrich, 323586) a Zetapotential of −24 mV, and with Span 85 (Aldrich, S7135) a Zetapotential of 0 mV is found.

Example 10: Charge Selective Dispersant with a Soft/Bulky Ion, EPD Particle, and Electrophoretic Ink An ion exchange between 4.0 g Sodium tetrakis[3,5-bis(trifluoromethyl)phenyl]borate dihydrate (Merck, 824494) and 1.2 g [2-(Methacryloyloxy)ethyl]trimethylammonium chloride (80% in water, Aldrich, 408107) is performed with 38 g deionised water and 26.6 g dichloromethane (Merck, 106050). After shaking and phase separation, the DCM phase is isolated and washed twice with fresh d.i. water. The final product, [2-(Methacryloyloxy)ethyl]trimethylammonium tetrakis[3,5-bis(trifluoromethyl)phenyl]borate, is received by removing the DCM from the resulting organic phase by using a rotation evaporator.

1.0 g of the [2-(Methacryloyloxy)ethyl]trimethylammonium tetrakis[3,5-bis(trifluoromethyl)phenyl]borate, 3.8 g of Polystearate methacrylate (Example 3), 1.0 g of 2-(tert-Butylamino)ethyl methacrylat (Aldrich, 444332), 20.0 g n-butylacetate (Merck, 101974) are added to a 100 ml three-neck flask equipped with a reflux condenser, nitrogen inlet and stopper. The mixture is preheated to 85° C. and the reaction is started by addition of 0.25 g Vazo 67 (DuPont). The reaction is then allowed to continue for 2 hours. A solution with a solid content of 18.1% is obtained.

5.5 g of the polymer solution, 10.0 g of $TiO_2$ pigment (Kronos 2081), and 50 ml of Dodecane (Merck, 820543) are combined in a 100 ml round-bottom flask. The mixture is stirred for 30 min, then subjected to ultrasound for 30 min, and finally heated to 120° C. for 5 hours. The product is centrifuged and dispersed thrice in fresh dodecane and finally filtered through a 1 µm clothes (SEFAR NITEX 03-1/1). The resulting product has a solid content of 37.2%.

Electrophoretic inks with 3% wt of the prepared particles in dodecane are prepared and the electrophoretic mobility tested in a test cell consisting of two parallel glass slides (20 µm separation). The bottom glass slide contains an interdigitated ITO electrode pattern with a 500 µm electrode spacing. The particles in the electrophoretic ink exhibit an electrophoretic mobility of 0.006 µm cm $V^{-1}s^{-1}$.

Example 11: Charge Selective Dispersant, EPD Particle with Charge Selective Dispersant and Electrophoretic Ink 700.0 g of n-butyl acetate (Merck, 101974) are pre-heated to 80° C. (temperature in the reaction vessel) in a 2000 ml 3-neck flask equipped with reflux condenser, nitrogen supply, and septum. 200.0 g of Polystearate methacrylate (Example 3), 90.0 g of 2-tert-Butylaminoethyl-methacrylate (Aldrich, 444332), and 2.4 g Vazo 67 (DuPont) are combined and added over a period of 3 hours using a dripping funnel. After addition of the reactants, an additional 2.4 g of Vazo 67 is added and the reaction is allowed to continue for 2 h. A polymer solution with a solid content of 29.4% is obtained. Subsequently, 440.0 g dodecane are added to the reaction mixture and the n-butyl acetate is removed under vacuum and heating to 50° C. until the n-butyl acetate content reached below 1% (GC with FID detector). The solid content of the resulting polymer solution is adjusted to 30% by adding dodecane.

The resulting polymer solution is used to prepare a dispersion of white reflective EPD particles. 50.0 g $TiO_2$ pigment (Sachtleben R610L) were dispersed in 51.1 g dodecane with 10.0 g of the 30% active material containing polymer solution. The dispersion is prepared using a dissolver disc followed by bead milling.

Electrophoretic inks with two oppositely charged particles are prepared resulting in a formulation of 25.0% wt of the prepared particles, 10% wt black dyed particles (prepared as described in WO 2012/019704), 0.5% Aerosol OT, 1.5% Span 85 in Dodecane. The electrophoretic ink is tested in a standard LC test cell consisting of two parallel glass slides (20 µm separation) both having a 1×1 inch ITO coating. Electrical potential between 1 and 60V are applied, while measuring the resulting white state reflectivity (WSR %) (integrating sphere, MgO standard) and contrast ratio of the fluid (FIG. 5). The associated switching time as a function of applied electrical potential is shown in FIG. 6.

Example 12: Charge Selective Dispersant 50.0 g dodecane were heated to 75° C. (temperature inside the reaction vessel) in a 250 ml three-neck flask. A mixture of 16.0 g methacrylate terminated polydimethylsiloxane (ABCR, AB116684), 24.0 g 2-(tert-Butylamino)ethyl methacrylat (Aldrich, 444332), 1.0 g Vazo 67 (DuPont), and 43.3 g dodecane is added to the reaction mixture over a period of 1.5 h. After one additional hour, 1.0 g of Vazo 67 is added and the reaction allowed to continue for 2 hours.

A 30% solution of polymer stabilizer is obtained.

FIGURES

FIG. 1 shows the WSR % and the contrast ratio for Example 6

FIG. 2 shows the response time for Example 6

FIG. 3 shows the WSR % and the contrast ratio for Example 7

FIG. 4 shows the response time for Example 7

FIG. 5 shows the WSR % and the contrast ratio for Example 11

FIG. 6 shows the response time for Example 11

The invention claimed is:

1. An electrophoretic fluid comprising particles comprising a core particle and a polymeric shell adsorbed onto the core particle wherein the polymeric shell consists of a random copolymer having monomer or macromonomer building blocks, and the random copolymer comprises at least one charged or chargeable, optionally hydrocarbon insoluble, structural unit and at least one hydrocarbon soluble, stabilising structural unit consisting of acrylated or methacrylated polycondensates of fatty acids.

2. The electrophoretic fluid according to claim 1, wherein the charged or chargeable, optionally hydrocarbon insoluble, structural unit of the random copolymer amounts 20-95% by weight of the total random copolymer.

3. The electrophoretic fluid according to claim 1, wherein the charged or chargeable, optionally hydrocarbon insoluble, structural unit of the random copolymer comprises 2-(tert-Butylamino)ethyl methacrylate, 2-(Diethylamino)ethyl methacrylate, 2-(Dimethylamino)ethyl methacrylate, 2-methacryloxy ethyl trimethyl ammonium chloride (MOTAC), and/or acryloxy ethyl trimethyl ammonium chloride (AOTAC).

4. The electrophoretic fluid according to claim 1, wherein the hydrocarbon soluble, stabilising structural unit of the random copolymer consists of acrylated or methacrylated polycondensates of fatty acids.

5. The electrophoretic fluid according to claim 1, wherein the hydrocarbon soluble, stabilising structural unit of the random copolymer consists of acrylated or methacrylated polycondensates of 12-hydroxystearic acid.

6. The electrophoretic fluid according to claim 1, wherein the core particle is an organic or inorganic pigment.

7. The electrophoretic fluid according to claim 1, wherein the core particle is an organic or inorganic pigment comprising titanium dioxide in the rutil, anatase, or amorphous modification or carbon black.

8. The electrophoretic fluid according to claim 1, wherein the hydrocarbon soluble, stabilising structural unit of the random copolymer consists of acrylated or methacrylated polycondensates of fatty acids based on the following monomers: 2-hydroxydecanoic acid, 2-hydroxyoctanoic acid, 2-hydroxyoctanoic acid, 3-hydroxydecanoic acid, 3 hydroxyoctanoic acid, 10-hydroxydecanoic acid, 12-hydroxyoctadecanoic acid, 12-hydroxyoctadecanoic acid, 12-hydroxystearic acid, 15-hydroxypentadecanoic acid, 16-hydroxyhexadecanoic acid, 2-hydroxyhexadecanoic acid, 2-hydroxytetradecanoic acid, 2-hydroxydodecanoic acid, 2-hydroxyhexanoic acid, DL-α-hydroxystearic acid, DL-β-hydroxylauric acid, DL-β-hydroxymyristic acid, DL-β-hydroxypalmitic acid, 2-hydroxy dodecanoic acid, 15-hydroxy-hexadecanoic acid, 17-hydroxy-octadecanoic acid, and 12-hydroxy-9-cis-octadecenoic acid.

9. The electrophoretic fluid according to claim 1, wherein the random copolymer consists of acrylated or methacrylated polycondensates of 12-hydroxystearic acid, 2-tert-butylaminoethylmethacrylate, and optionally, (2,3-epoxypropyl)-methacrylat.

* * * * *